United States Patent
Cullen et al.

(10) Patent No.: US 6,266,535 B1
(45) Date of Patent: *Jul. 24, 2001

(54) TELECOMMUNICATION NETWORK WHICH TRANSMITS THE STATE OF AN OCCURRENCE OF A NON-CALL RELATED SERVICE REQUEST ASSOCIATED WITH A NETWORK TERMINATION

(75) Inventors: John Michael Cullen; Alastair Norman Brydon, both of Suffolk (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/586,715
(22) PCT Filed: Aug. 1, 1994
(86) PCT No.: PCT/GB94/01689
  § 371 Date: Feb. 8, 1996
  § 102(e) Date: Feb. 8, 1996
(87) PCT Pub. No.: WO95/04436
  PCT Pub. Date: Feb. 9, 1995

(30) Foreign Application Priority Data

Jul. 30, 1993 (EP) .................................. 93306051

(51) Int. Cl.[7] ..................................... H04Q 7/20
(52) U.S. Cl. ............................................. 455/461
(58) Field of Search .................... 455/461, 436, 455/414, 435

(56) References Cited

U.S. PATENT DOCUMENTS

| | | |
|---|---|---|
| 4,547,633 | 10/1985 | Szechenyi . |
| 4,831,649 | 5/1989 | Mejane . |
| 4,965,821 | 10/1990 | Bishop et al. . |
| 4,980,907 | 12/1990 | Raith et al. . |
| 4,984,234 | 1/1991 | Vergnaud et al. . |
| 5,040,177 | 8/1991 | Martin et al. . |
| 5,115,463 | 5/1992 | Moldavsky et al. . |

(List continued on next page.)

FOREIGN PATENT DOCUMENTS

| | | |
|---|---|---|
| 9223853 | 12/1994 | (AU) . |
| 0 459 337 A1 | 2/1991 | (EP) . |
| 0 454 332 A2 | 10/1991 | (EP) . |
| 0 463 384 A1 | 1/1992 | (EP) . |
| 0 466 078 A2 | 1/1992 | (EP) . |
| 0 466 078 A3 | 1/1992 | (EP) . |
| 0 509 705 A2 | 10/1992 | (EP) . |

OTHER PUBLICATIONS

Kuisch, Janmaat, Mulder, Keesmaat, "A Practical Approach to Service Interactions", IEEE Communications Magazine, Aug. 1993.*

(List continued on next page.)

Primary Examiner—William Cumming
(74) Attorney, Agent, or Firm—Nixon & Vanderhye P.C.

(57) ABSTRACT

A telecommunications network provides communications links between network terminations, and includes switches, two or more network terminations interconnectable by the switches to establish communications links between network terminations and a service control point for providing service to or for the network termination and/or the switches. The network determines the occurrence of a service request from a network termination and for the switches independent from a request for establishing a communications link between network terminations.

5 Claims, 3 Drawing Sheets

SSM EXAMPLE 2

MT - MOBILE TERMINAL
BSS - BASE STATION SUBSYSTEM
SCP - SERVICE CONTROL POINT
LE - LOCAL EXCHANGE
BCSM - BASIC CALL STATE MODEL

U.S. PATENT DOCUMENTS

| | | |
|---|---|---|
| 5,127,042 | 6/1992 | Gillig et al. . |
| 5,168,498 | 12/1992 | Adams et al. . |
| 5,200,954 | 4/1993 | Teel, Jr. et al. . |
| 5,247,571 * | 9/1993 | Kay et al. . |
| 5,260,987 | 11/1993 | Mauger . |
| 5,297,189 | 3/1994 | Chabernaud . |
| 5,303,285 | 4/1994 | Kerihuel et al. . |
| 5,333,178 * | 7/1994 | Norell . |
| 5,353,331 * | 10/1994 | Emery et al. . |
| 5,418,844 * | 5/1995 | Morrisey et al. . |
| 5,491,834 | 2/1996 | Chia . |
| 5,533,114 | 7/1996 | Ballard et al. . |

OTHER PUBLICATIONS

Mukasa, Ogino, Nakao, Wakahara, "Proposals of Call Modeling for Intelligent Network Over Broadband ISDN", Global Telecommunications Conference, 1995, Nov. 13, 1995.*

Gilmour et al, "Intelligent Network/2: The Architecture, The Technical Challenges, The Opportunities", IEEE Communications Magazine, Dec. 1988, pp. 8–11 and 63.

Bauer et al, "Designing Service–Independent Capabilities For Intelligent Networks", IEEE Communication Magazine, Dec. 1988, pp. 31–41.

Goodman, "Trends in Cellular and Cordless Communications", IEEE Communications Magazine, Jun. 1991, pp. 31–40.

Duran et al, "International Standards for Intelligent Networks", IEEE Communications Magazine, Feb. 1992, pp. 34–42.

Jabbari, "Intelligent Network Concepts in Mobile Communications", IEEE Communications Magazine, Feb. 1992, pp. 64–69.

Rahnema, "Overview of the GSM System and Protocol Architecture", IEEE Communications Magazine Apr. 1993, pp. 92–100.

Lilleniit et al, "Glass and Beyond, Revolution in Residential Services", Telesis 1988 Three, pp. 49–54.

* cited by examiner

SERVICE STATE MODEL

DP1 - DETECTION POINT 1

DP2 - DETECTION POINT 2

SSM EXAMPLE 1

TE - TERMINAL EQUIPMENT

LE - LOCAL EXCHANGE

SCP - SERVICE CONTROL POINT

SSM - SERVICE STATE MODEL

BCSM - BASIC CALL STATE MODEL

SERVICE INVOCATION

SSM START (NULL)
ACTIVE

ACTIVE

SERVICE TERMINATION (BY USER)

ACTIVE

NULL

SSM EXAMPLE 2

MT - MOBILE TERMINAL
BSS - BASE STATION SUBSYSTEM
SCP - SERVICE CONTROL POINT
LE - LOCAL EXCHANGE
BCSM - BASIC CALL STATE MODEL

HANDOVER MONITORING ACTIVATION

HANDOVER MONITORING DEACTIVATION

TELECOMMUNICATION NETWORK WHICH TRANSMITS THE STATE OF AN OCCURRENCE OF A NON-CALL RELATED SERVICE REQUEST ASSOCIATED WITH A NETWORK TERMINATION

BACKGROUND OF THE INVENTION

1. Field of the Invention

The present invention relates to Intelligent Network (IN) based telecommunications networks.

2. Description of Related Art

There is currently considerable activity in technical standards bodies (CCITT, ISO etc) and elsewhere developing Intelligent Network (IN) standards and implementation. Simply, the basis of IN is to separate service provision from basic switching functionality in telecommunications networks. Typically, the processing required to implement network services is provided by computers which are independent from the network switching infrastructure. This allows for rapid creation and introduction of new services without being excessively constrained by network switches.

In present day IN standards (CCITT Capability Set 1-CS1) and implementations the platform for launching all IN services is a "Basic Call State Model" (BCSM) implicitly embedded in the software of each IN switch in a network. The BCSM defines a finite number of states in the lifetime of a telecommunication call e.g off-hook, collect digits, etc. Within the BCSM a number of Detection Points (DPs) are identified, at which certain events can trigger the switch to halt its call processing and refer to service control entities for further instructions. Service control entities are able to modify the call processing by, for example, providing the switch with routing information derived from a variety of parameters, e.g dialled number, time of day, day of week, subscriber preferences, etc, etc, thereby offering the possibility of developing a wide variety of user services.

IN has great potential for offering advanced network services in the future. It has been proposed to use IN principles and implementation as the basis for future mobile telecommunication systems, and while a number of IN enhancements needed to achieve this have already been identified, further changes will be required.

In the mobile environment the IN approach may be applied to the implementation of mobility services such as location management and handover, as well as conventional user services. Thus the processing required to achieve these mobility services is moved out of the network switches and into service control entities. Doing this reduces the impact of mobility on switch design, i.e there may be no need for dedicated mobile switching centres, and offers opportunity for providing mobility on a number of network platforms. By contrast, the existing GSM cellular radio system embeds its mobility functions in the switching infrastructure, e.g in mobile switching centres.

Present day IN services (CS1) are all built on the platform of the Basic Call State Model, (BCSM) in which the current state of a call in progress between two user terminals is stored, and this state is used to control other services. However, there is a problem in implementing some basic mobility services on the Basic State Model platform. Mobility services are inherently independent of calls in progress. In particular handover monitoring and location undate can occur at any time, independently of any prompt from either the user or the network management function. Moreover, some services require interactions involving only one user terminal, which interacts with an internal network termination such as a Location Register, or a Voice Message Centre (VMC). In this specification the term "network termination" is used to embrace both user terminals (e.g. telephone handsets) and such internal network terminations.

Handover is a function which typically takes place during a call in response to changes in signal quality. If the system detects a deterioration in the link between the mobile unit and the base station with which it is currently in communication, the system attempts to locate another base station which can provide a better link, establish a link with this second base station and to break the link with the first base station. This operation should take place without any action necessary on the part of the user (who should ideally not even be aware that it is happening). Moreover, user services such as voice messaging, which are controlled centrally by the service control entities in the network management centre, should be able to function unaffected whilst this process is taking place.

In the location update procedure a base station or a geographical group of base stations transmit a location identification transmission. Mobile units in standby mode (i.e. able to receive calls but not currently engaged in one) periodically monitor this transmission to determine their approximate location. Should the location identification change, the mobile unit reports its new location to the network. When a call attempt to the mobile unit is made, the system initially pages the mobile unit only in the area in which the mobile unit was last reported (i.e. it is paged only from the base station(s) having that location identification).

Clearly, changes in location state or handover may take place at times other than when a call state is changed (set up or cleared) and so the mobile unit's location state changes and handovers cannot be handled by the known Basic Call State Model.

SUMMARY OF THE INVENTION

According to a first aspect of the invention, there is provided a telecommunications network for providing communications links between network terminations, comprising:

switching means, two or more network terminations interconnectable to establish communications links between network terminations;

service control means for providing service to or for the network terminations and/or the switching means;

characterised in that the network has means for determining occurrence of a service request from a network termination and/or the switching means independent of the existence or state of any call traffic link between network terminations.

According to a second aspect of the invention, there is provided a telecommunications network comprising a plurality of physically interconnected nodes which can be functionally interconnected to support call traffic links, characterised in that there are means for assessing the occurrence of a service request associated with one of the nodes, independent of the existence of a call traffic link.

According to a third aspect of the invention, there is provided a method of providing a network service in a telecommunications network having a plurality of network terminations selectively interconnectable by switching means to establish call traffic links, wherein a service request can be transmitted from a network termination or switching means to a service control means irrespective of whether a call traffic link is established.

By separating the functions of the call state and service state models, mobility can be managed on IN principles independently of call traffic management. Moreover, in the invention, by embedding a Service State Model (SSM), independent of the BCSM, in the software of an IN switch, there is scope for adding a host of new call-independent services to those currently possible. Although mobility services such as handover and location management, which inherently require independence from call traffic, will be of particular importance, there is also scope for developing further services, currently unexplored, which stimulate network actions based not on the progress of a call but on other criteria such as time, weather, news, or the occurrence of particular events or circumstances.

In order to reduce the signalling overhead the handover and location update processes are ideally handled at a local level, within the base station or switching functionality itself, with only the current location data being communicated to the network control (e.g. the Home Location Register).

Preferred embodiments of the invention will now be described by way of example and with reference to the accompanying drawings, wherein:

DETAILED DESCRIPTION OF EXEMPLARY EMBODIMENTS

Figure 1:
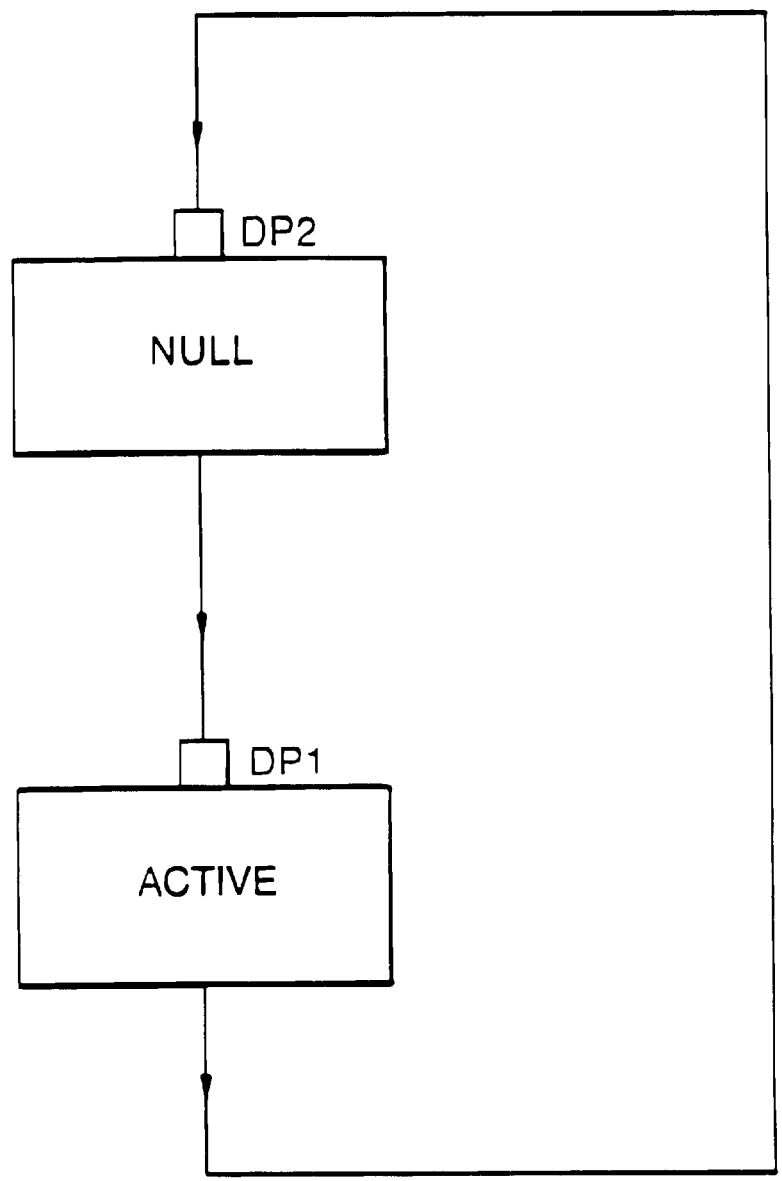
FIG. 1 is a schematic flow diagram illustrating the concept of a service state model of a preferred embodiment of the invention.

FIG. 1 shows a simple example of a Service State Model. In the example the model has only two states—null and active—and two detection points—DP1 and DP2. The detection points can be viewed as the points in the flow diagram at which service control logic may be triggered by the occurrence of a predetermined condition. The following examples illustrate how it might be employed.

EXAMPLE 1

Figure 2:
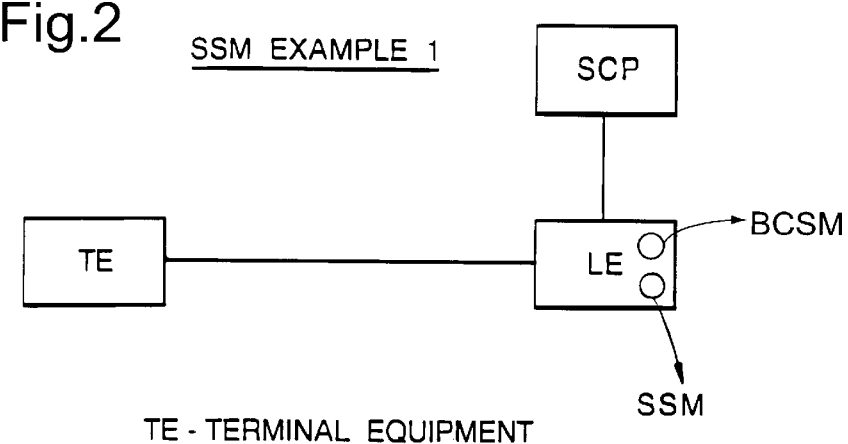
FIG. 2 is a schematic block diagram of an Intelligent Network-based telecommunications network according to a first preferred embodiment of the invention.
Figure 3A:
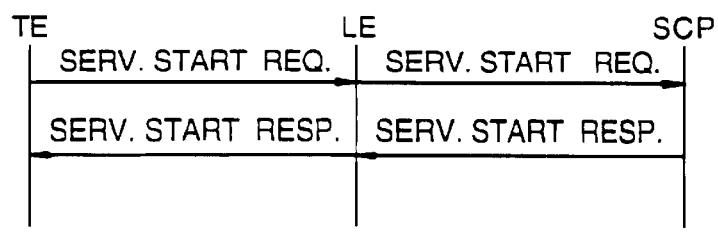
FIGS. 3a and 3b illustrate service processing in the IN of FIG. 2.
Figure 3B:
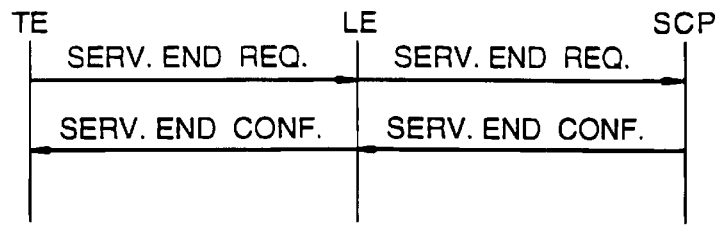

Call Independent Service—FIGS. 2 and 3a/b

In the null state no services are active. The service state model (SSM) resident in the local exchange (LE) is in the null state. A subscriber invokes a call independent service via terminal (TE) and the SSM moves to the active state. DP1 (FIG. 1) detects the service invocation, and triggers IN service control logic in the service control point (SCP) to activate the service as required. The service is then processed.

The SSM moves to the null state when the call independent service is terminated in some way, e.g by the subscriber, or on completion. DP2 detects the service termination, and triggers the IN service control logic to terminate activity on that service. The service state model may be located in any suitable part of the intelligent network. For example it may be located in the service control point (SCP) instead of the local exchange (LE) as shown. For example, for handover it is appropriate to have the service state model associated with the base station intelligence because changes in state are associated with handovers from one base station to another. However for location update it is usual for the location to be determined only in relation to designated groups of base stations. Consequently no change in state would necessarily occur when the mobile unit is no longer within range of the same base station. It would therefore be more appropriate to have the location update service state model associated with some higher-level functionality such as a mobile switching centre (MSC) controlling a number of base stations, or at a service control point.

Different state models can be associated with different levels of functionality in the intelligent network layout, depending on the nature of the services to which they relate.

EXAMPLE 2

Figure 4:
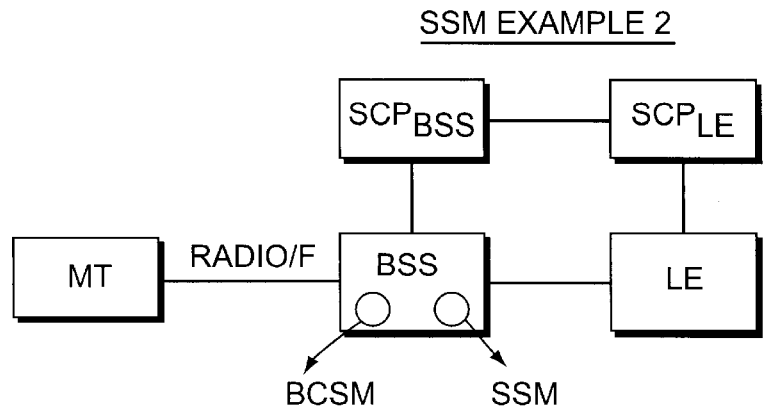
FIG. 4 is a schematic block diagram of an Intelligent Network based telecommunications network according to a second preferred embodiment of the invention.
Figure 5A:
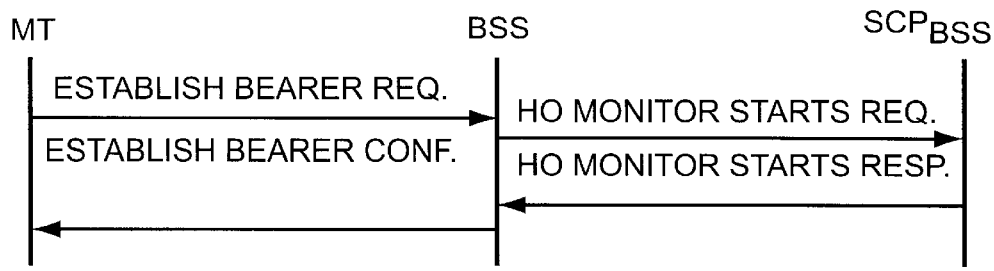
FIGS. 5a and 5b illustrate service processing in the IN of FIG. 4.
Figure 5B:
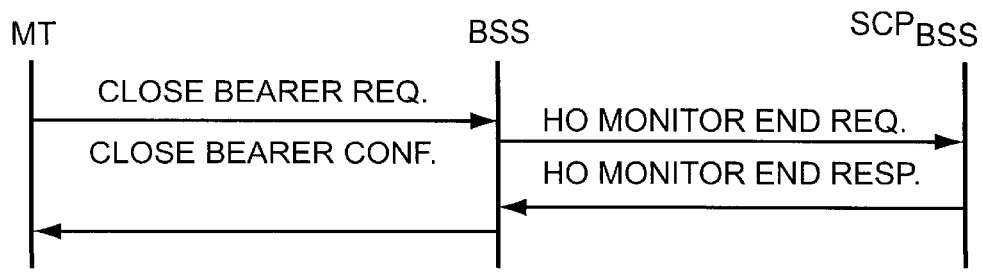

Handover—FIGS. 4 and 5a/b

This example refers specifically to the case of handover as an IN service.

With the Service State Model in the null state the handover service is disabled. At the moment a physical radio connection is established between a mobile terminal (MT) and the fixed network, whether for a signalling transaction only, such as registration (i.e. indicating to the network that the mobile unit is able to receive calls) or to instigate a call attempt, the SSM moves from the null state to the active state. DP1 detects this transition, and triggers IN service control to begin continuous handover monitoring (to detect the appropriate time for a handover). In the active state the base station monitors the radio link for signal quality and passes the information to the Service Control Point (SCP). The service control logic is then responsible for detecting the need for handovers, and effecting such handovers as required.

The SSM returns to its null state when the physical radio connection between the mobile unit and the network is no longer required. DP2 detects this transition, and triggers IN service control to terminate handover monitoring. It will be seen from this that the service state model SSM remains in its active state whether or not a call is in progress, as long as the mobile unit is registered with the base station BSS.

Where Call-related, call-independent and mobility services may all be required in parallel there may be need for several Service State Models; for example:

Basic Call State Model for Call-related services

Service State Model for Call-independent services

Mobility Service State Model for Mobility services

There may be a need for multiple instances of Service State Models if several different services, or service types, are simultaneously active.

These models operate independently of each other. For example a Mobility Service State Model may be activated when a mobile unit first registers with a base station on power-up or location update. When a call is made to or from the mobile unit a Call State Model is activated. A handover may take place during the call, in which the Mobility Service State Model associated with the first base station would be deactivated and a Mobility Service State Model associated with the new base station would become activated. At the end of the call the Call State Model is deactivated, but if the user does not power down the unit the Mobility Service State Model remains activated, and controls any location updates which may be necessary as the mobile unit moves around the network. Other services, such as call diversion, which can be invoked at any time whether a call is in progress or not, are handled by call-independent Service State Models.

What is claimed is:

1. A telecommunications network comprising:

a plurality of physically interconnected nodes which can be functionally interconnected to support call traffic links;

a Basic Call State Model, (BCSM) in which the current state of a call in progress between two user terminals is stored and used to control call-related services;

additional means for assessing the occurrence of a non-call related service request associated with one of the nodes including a functional element triggerable between two states: a first state where no service request is in process and second state where a service request is in process, the means for assessing being triggerable independently of the existence of a call traffic link so that the condition of the functional element controls the mode of operation of the network; and means for transmitting the state of the assessing means associated with a network termination to the service control means, wherein:

the plurality of nodes includes a plurality of network terminations, there being provided switching means to provide functional interconnections between said terminations, and the triggering of a means for assessing causes a service request to be transmitted from a node to a service control means.

2. A telecommunications network as in claim 1 wherein there is a plurality of means for assessing including means for identifying requests of differing types or classes of services.

3. A telecommunications network as in claim 1 wherein the services are non-call related services.

4. A telecommunications network as in claim 1 wherein the network includes a mobile radio network.

5. A telecommunications network as in claim 4 wherein the mobile radio network is a cellular radio network.

* * * * *